United States Patent Office 3,690,828
Patented Sept. 12, 1972

3,690,828
ORE EXTRACTION
Herbert Barclay Baetz, Kingston, Jamaica (1211 W. Bay Ave., Newport Beach, Calif. 92660), and Robert C. Lightbourne, 5 S. Race Course, P.O. Box 496, Kingston, Jamaica
Filed Feb. 5, 1970, Ser. No. 9,015
Claims priority, application Great Britain, Feb. 6, 1969, 6,494/69
Int. Cl. C01g 23/00, 49/00
U.S. Cl. 423—149
9 Claims

ABSTRACT OF THE DISCLOSURE

A method of extracting a metal forming a volatile chloride, such as iron and/or titanium, from a material, such as bauxite or a high silica bauxite. The material is reacted with a hot gaseous mixture of sulphur dioxide and chlorine above the vaporisation temperature of the metal chloride produced during the reaction and the gaseous products of the reaction separated from the solid residue. The metal chloride is then isolated from the other gaseous reaction products.

---

Figure 1:
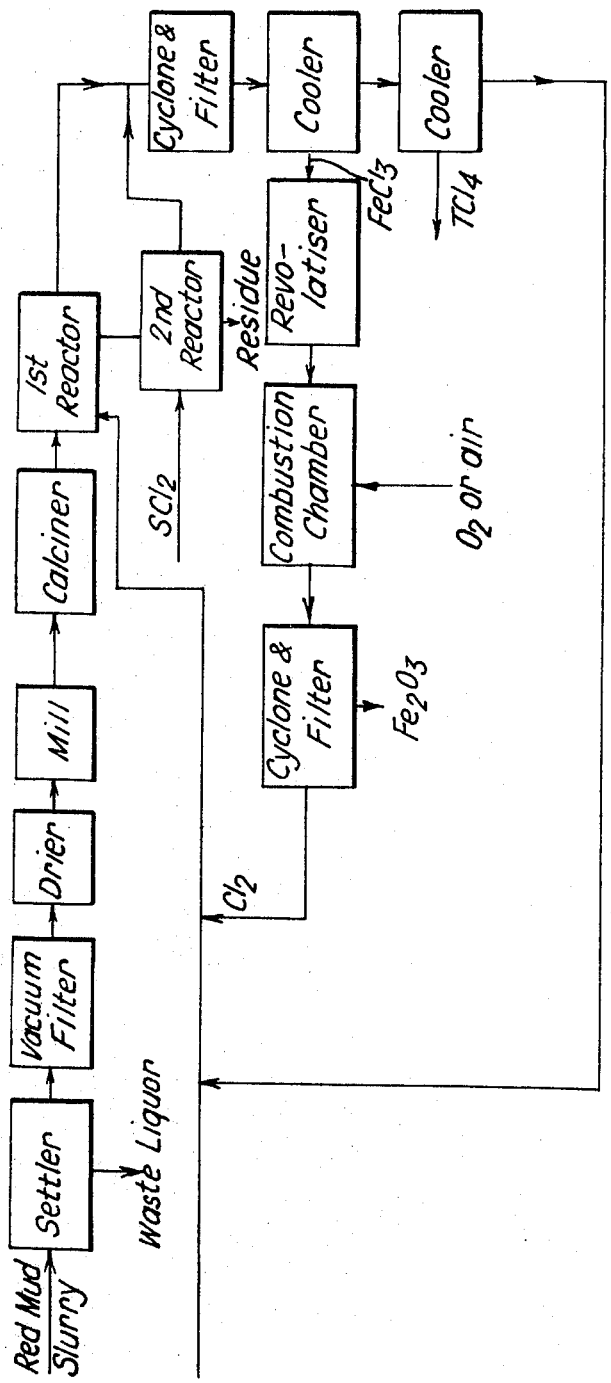

This invention relates to a method of extracting a metal from an ore thereof, and is particularly concerned with the extraction of a metal in the form of its anhydrous chloride.

Metal chlorides in their anhydrous form find, in some cases, a ready market and, in some cases, are useful as an intermediate material in a process designed to provide pure oxides of the metals or the metals themselves. The extraction of metals from their ores by treatment with hydrochloric acid has been tried, but for a number of reasons it has not found commercial favour. In my British Pat. No. 1,056,488, I have described and claimed a method of treating raw mineral ores with hydrogen chloride gas. While this method overcame many of the disadvantages of using hydrochloric acid solution for treating the ores, the extracted metals are somewhat hydrated and must then be further treated in order to convert them to the pure anhydrous form.

Certain metals, such as titanium, can be advantageously extracted from their ores by means of chlorine gas and some reducing gas. Titanium tetrachloride vaporises at a temperature of approximately 140 degrees centigrade. This property may be used to separate the titanium from other constituents of the ores. For example, the raw titanium ore is calcined, then ground and sifted. It is then intimately mixed with carbon and is formed into briquets which are packed into a chlorinating chamber, where they are subjected to chlorine gas at an elevated temperature. The chlorination results in the formation of volatile titanium tetrachloride, which passes out of the chlorinating chamber with the excess chlorine gas and the oxides of carbon formed as a result of reduction of the ore. The titanium tetrachloride is relatively easily separated from the other gaseous constituents as it is a liquid at room temperature and may, therefore, be readily condensed.

In my co-pending British Pat. No. 1,180,912, I have described and claimed a method of extracting iron from a material containing the same, including the step of reacting the material with a hot gaseous mixture of sulphur and chlorine above the vaporisation temperature of ferric chloride. Whilst this process is satisfactory from a number of aspects, there is the problem of economic re-use or disposal of the relatively large quantities of sulphur dioxide or sulphuric acid produced thereby.

Herein, the term "ore" is used generically to include such material as ores, waste products and slags, containing metal oxides, etc., particularly iron and titanium oxides.

An object of this invention is the provision of a method for commercially extracting a metal or metals, e.g. iron and/or titanium together with other marketable metals, oxides or other compounds, without the formation of relatively large amounts of sulphur compounds unsuitable for re-use in the process.

Accordingly, the present invention provides a method of extracting a metal forming a volatile chloride, more especially iron and titanium, from a material, which includes the step of reacting the material with a hot gaseous mixture of sulphur dioxide and chlorine above the vaporisation temperature of the metal chloride produced during the reaction, separating the gaseous products of the reaction from the solid residue, and isolating the metal chloride from the other gaseous reaction products. Normally, as well as iron, titanium would be separated out as the tetrachloride from the iron chloride. The ferric chloride and/or the titanium tetrachloride would generally be converted into their respective oxides, the chlorine liberated being collected for recycling to the reactor.

The volatile chlorides consisting mostly of iron and titanium chlorides and the excess reacting gases leave the reacting chamber whilst a residue stays in the chamber.

Normally, it is also advisable to pass solid residue, from the first step, which is largely reacted at this point, to a second portion of the chlorination chamber or even a second reactor for virtually complete chlorination of the iron and titanium by reacting it with gaseous sulphur and chlorine. This second chlorination step, using a weight ratio of gaseous chlorine and sulphur of approximately four-and-a-half to one at a temperature in the range of from 350° C. to 450° C. can achieve increased yields, particularly of titanium. Under these conditions only the residual iron oxide and titania are chlorinated and are volitalized, leaving the alumina, silica, etc. behind in the sulphated residue. Sulphur dioxide is also produced in these reactions and this is conveniently recycled through the first reactor. The amount of sulphur used in this second step is normally the amount required to produce sufficient make-up sulphur dioxide, i.e. sufficient sulphur dioxide to replace any mechanical and chemical losses occurring in the process, the latter arising principally from any undecomposible sulphated residue. These losses will normally amount to less than 10% of the weight of the starting material.

The residue of the reaction consists mainly of metal sulphates. Further treatment of this residue is dictated by economic considerations. The residue may be calcined at 900° C. or above producing sulphur dioxide reusable in the process. It may also be extracted aqueously to produce usable metal sulphates, particularly aluminium sulphate, which may be converted to aluminium oxide and reusable sulphur dioxide by calcination or it can be marketed as such.

All parts and percentages herein are expressed by weight, unless otherwise specified.

The method of the present invention is particularly applicable to the extraction of iron together with titanium, from the "red mud" which is a waste product in the production of alumina from bauxite. A typical analysis of such red mud after calcination is:

| | Percent |
|---|---|
| Iron as $Fe_2O_3$ | 55 |
| Titanium as $TiO_2$ | 6 |
| Aluminium as $Al_2O_3$ | 18 |
| Silicon as $SiO_2$ | 6 |
| Calcium as $CaO$ | 6 |
| Sodium as $Na_2O$ | 5 |
| Phosphorus as $P_2O_5$ | 4 |

Another typical analysis of Kirvine "red mud" is:

| | Percent |
|---|---|
| Loss on ignition | 13.6 |
| Silica as $SiO_2$ | 4.5 |
| Iron as $Fe_2O_3$ | 50.4 |
| Aluminium as $Al_2O_3$ | 12.7 |
| Titanium as $TiO_2$ | 9.4 |
| Others | 9.4 |

A typical analysis of high silica bauxite is:

| | Percent |
|---|---|
| Loss on ignition | 22.0 |
| Silica as $SiO_2$ | 15.4 |
| Iron as $Fe_2O_3$ | 19.7 |
| Aluminium as $Al_2O_3$ | 35.8 |
| Titanium as $TiO_2$ | 2.6 |
| Others | 4.5 |

Further typical, particular analyses are:

| | Kirvine Red Mud | | High silica bauxite | |
|---|---|---|---|---|
| | Dried | Calcined | Dried | Calcined |
| Loss on ignition | 13.4 | | 18.6 | |
| $SiO_2$ | 5.9 | 6.8 | 15.4 | 19.0 |
| $Fe_2O_3$ | 45.3 | 52.4 | 17.7 | 21.8 |
| $TiO_2$ | 7.9 | 9.1 | 2.2 | 2.7 |
| $Al_2O_3$ | 15.0 | 17.3 | 44.9 | 55.3 |
| Others | 12.5 | 14.4 | 1.2 | 1.2 |

After the first chlorination at about 450° C. of red mud in accordance with the invention, a typical residue contains less than 5% of ferric oxide and less than 1% of titanium oxide, whilst the loss on ignition (which mainly represents decomposable sulphate formed during the reaction, known as "digestion") typically is from 40 to 50%.

A typical analysis of a residue from chlorination (dual reaction) is:

| | Percent |
|---|---|
| Loss on ignition (representing loss of $SO_3$) | 44.6 |
| Soluble sulphate as $SO_3$ | 43.9 |
| Soluble aluminium as $Al_2O_3$ | 11.4 |
| Total iron as $Fe_2O_3$ | 3.1 |
| Total silica as $SiO_2$ | 9.6 |
| Total titanium as $TiO_2$ | 0.21 |
| Total chlorine as $Cl^-$ | 0.24 |

The great majority of the iron and titanium are removed during the method of the invention, leaving the alumina and silica. This, of course, is an advantage in making separations, particularly as compared with my copending British Pat. No. 1,180,912, in which the alumina is also removed from the material.

Pressure may be used for the sulphur dioxide/chlorine chlorination reaction with pressure equipment, for example up to 50 p.s.i.g. While pressure may be suitable for some materials, especially low grade bauxite, the only advantage would generally appear to be that the chlorination is more effective with substantially larger particles, thus possibly eliminating the necessity of milling the starting material.

The following four reactions, numbered (1) to (4), represent the main reactions which occur during the first step of the chlorination process of the present invention, as far as the iron extraction is concerned. Similar reactions cover the extraction of titanium oxide.

$$\text{Iron Oxide bearing material} + 3SO_2 + 3Cl_2 = 2FeCl_3 + \text{Sulphated residue} \quad (1)$$

$$2FeCl_3 + \frac{3}{2}O_2 = Fe_2O_3 + 3Cl_2 \quad (2)$$

$$Fe_2O_3 + 3H_2 = 2Fe + 3H_2O \quad (3)$$

$$\text{Sulphated residue} + \text{heat} = SO_2 + O_2 + \text{Final residue} \quad (4)$$

The reactions applying to the sulphur/chlorine reaction have been explained in our co-pending patent.

Equation (1).—The reaction applies to the chlorination of iron and similarly applies to chlorination of titania, but it does not apply to alumina or silica.

Equation (2).—This reaction takes place at relatively low temperatures, generally above 500° C. It may sometimes be necessary to introduce excess air or oxygen at this point, as seen from the embodiments described and from the drawings referred to hereinafter.

Equation (3).—This reaction is very straight-forward. It commences at a little over 350° C. and 900° C., sintering begins. Accordingly, a temperature between these extremes should be used and in fact, the optimum reduction temperature range appears to be from 800 to 850° C. By using hydrogen as a reducing agent, a very pure iron powder can be produced (maximum sulphur impurity of 0.02%). In plant operation, it is normally necessary to purify titanium tetrachloride prior to converting to oxide or metal, but this is easily accomplished using known techniques.

Equation (4).—In this reaction, sulphur dioxide is recovered from the sulphated residue from the reactor by heating the same above its decomposition temperature, namely above 900° C. and preferably above 1000° C. It is possible to recover the aluminum sulphate by a wet process, but this process is difficult to perform satisfactorily and in any case in the most efficient operation of the present invention only a portion of the alumina is present as sulphate, which favours calcining of the residue without recovery of the alumina. The calcined residue, from "red mud" as the starting material, is normally suitable for use in brickmaking.

Figure 2:
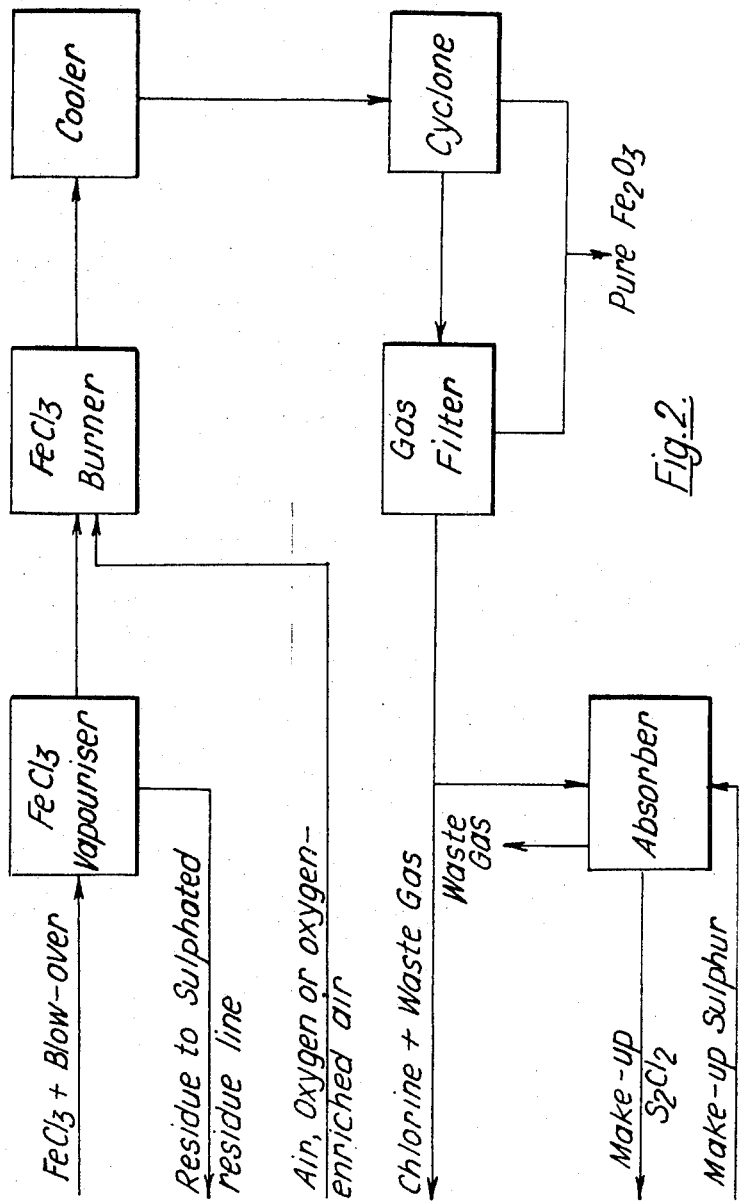
Figure 3:
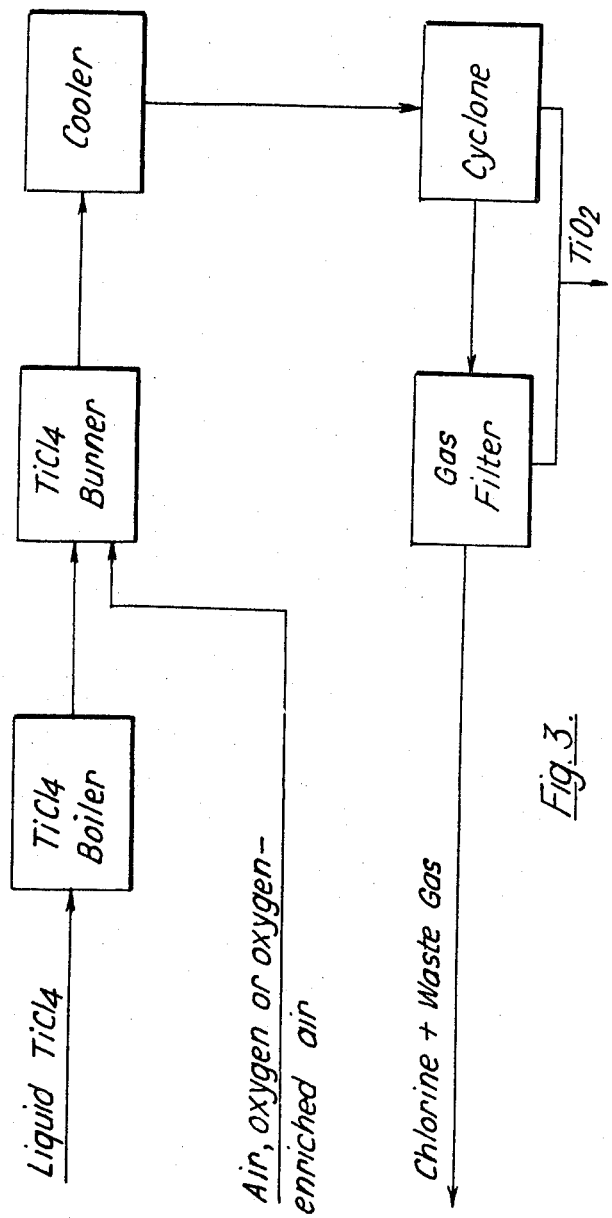

For a better understanding of the invention and to show how the same may be carried into effect, an embodiment thereof will now be described, by way of example, with reference to the accompanying drawings, in which FIG. 1 shows a block diagram of a plant for extracting the chlorides of titanium and iron from red mud, containing substantially no water at the time of chlorination, and subsequent treatment thereof, FIG. 2 shows a block diagram of a plant for combusting ferric chloride, and FIG. 3 shows a block diagram of a plant for combustion of titanium tetrachloride.

A slurry of red mud from an alumina/bauxite plant is normally pumped in very dilute caustic aluminate liquor, to a settler, the waste liquid being discharged. This slurry will normally be the under-flow from the alumina plant thickener in the last mud-washing stage and will generally contain from 3 to 7 grams per litre of sodium hydroxide. It may be economically desirable to further wash the mud to decrease the sodium hydroxide content which would consume in the process non recoverable sulphur. The slurry is then thickened by gravity settling, then filtered using a vacuum drum filter with roller discharge to produce a cake containing approximately 30% solids. This cake is allowed to air dry until it becomes approximately 50% solids. This dried material is quite friable and is readily ground to the desired particle size in a roller crusher or similar type of equipment. In practical plant operation, the optimum particle size will depend on the configuration and operating conditions of the chlorination reactor and will be adjusted to obtain maximum reactivity with a minimum of mechanical losses. The dried and sized material will then be fed in a calciner, for example of the rotary or fluid-bed type, and heated at about 800° C. to remove substantially all the water. Generally a calcining temperature in the range of from 700 to above 1000° C. may be used. Alternatively, the sludge could be passed to a kiln, where it is dried at a temperature of about 1000° C., and then milled. The dried material is quite friable and is readily ground to 300 mesh or better. The dried material is then discharged into a cooler where the temperature is adjusted to a level which will permit the temperature in the first chlorination reactor to be maintained at the desired value. The first reactor is preferably operated at a temperature in the range of from 350 to 450° C.

In the first reactor, maintained at a temperature in the range of from 350 to 450° C., the material reacts with an equimolar amount of gaseous chlorine and sulphur dioxide fed countercurrently to the solids flow. It is not normally necessary to heat the reactor, since the temperature of the reactor can be controlled by adjustment of the temperature of the material entering the reactor and the rate of feeding and temperature of the reaction gases. A fluidised-bed reactor may be used with materials which will not cake during the reaction. Normally, it will be advisable to pass the residue from the first reactor already largely reacted to a second reactor for the chlorination of the iron and titanium. When using red mud as a starting material the residue from the first reactor is virtually completely chlorinated. In this second reactor, the reacting gas flow consists of a gaseous mixture of chlorine and sulphur in a weight ratio of approximately four-and-a-half to one. The temperature will be the same as in the first reactor, namely in the range of from 350 to 450° C.

In both reactors, ferric chloride and titanium tetrachloride will be vaporised leaving alumina, silica, alkaline-earth and alkali elements in the residue which will have absorbed a large amount of sulphur (usually 35% to 45% by weight as $SO_3$). A typical residue contains substantially less than 5% of ferric oxide and less than 1% of titanium oxide as stated above. The weight of the residue will normally be approximately the same as the starting material, slightly more or less depending on the amount of sulphur used in the second step, the more sulphur the less residue weight. The fact that the aluminium oxide is not extracted from the residue as it was in the invention described under my co-pending British Pat. No. 1,180,912 is a great advantage when the starting material is red mud which contains a relatively large percentage of aluminium oxide.

The effluent gases from the reactors are passed through a cyclone and then to a cooler maintained at a temperature of about 200° C. so that the condensing ferric chloride may be removed continuously. The gases from this cooler contain mainly titanium tetrachloride and any excess gaseous reactants. The gases are then passed through a second cooler, to condense the titanium tetrachloride, maintained at a temperature lower than 50° C., the effluent gases being recycled to the process. The tetrachloride is then drawn off, purified, for sale as such or for burning to high grade pigment or reduction to titanium metal, with the evolved chlorine, in either case, recycled through the chlorination process.

The condensed and collected ferric chloride is revolatised and passed to a combustion chamber where it is reacted with air or oxygen at a temperature above 500° C., for example, 600 to 800° C. The resulting ferric oxide and chlorine gas are separated in a cyclone and filter, the chlorine being returned to the system. Depending on whether any excess oxygen or air was introduced into the ferric chloride combustion chamber, it may be necessary to compress and liquefy the chlorine. In either case, the chlorine would be suitable for returning to the system at the reactor.

Clearly, make-up sulphur dioxide and chlorine will normally be required to compensate for losses in the system. Normally chemical losses of chlorine will be less than 1% and the chlorine will be injected into either or both of the two reactors. Make-up sulphur will be added as elemental sulphur vaporised in a stream of chlorine at the stage of the second reactor. As mentioned previously, the balance between the two chlorinating steps will be adjusted to provide to the first step the necessary amount of sulphur dioxide to compensate for process loss.

The complete plant installation will generally include several steps to purify and transform the metal chlorides extracted into the desired marketable products and to collect and purify the reaction gases for re-use. In addition through the use, for example, of rotary or screw type feeders and discharges, and other known equipment, it is possible to operate the entire process continuously. It will also involve heat recovery and transfer systems will also be involved. However, these processes are well known and are in commercial use and, therefore, they will not be described here.

The reactions in the reactors are exothermic and no heat imput will generally be required. In fact, cooling may be necessary. The two reactors could, for example be essentially cylindrical slightly inclined, high frequency vibrated chambers. The material could enter and leave the reactors through rotary feeders which would ensure controlled feed and sealing of the reactors. A slowly revolving shaft fitted with paddles or buckets could stir the material and provide adequate contact between the solid and gaseous reactants. Since the reactions can be effected at 350 to 450° C., Inconel, Inconel-steel sandwich material or porcelainised steel could be used.

It would appear that the residue from the reactors is suitable for making refractory bricks, at least when only iron and titanium are removed from red mud.

FERRIC CHLORIDE COMBUSTION

Ferric chloride and any blow-over from digestion is passed to a ferric chloride vaporiser, the vapour being sent to a ferric chloride combustion chamber and any non-volatized particles being returned to residue. Air, oxygen or oxygen enriched air is fed concurrently into the combustion chamber (it being noted that the economics as to the cost of oxygen versus the cost of compressing effluent gases will determine the exact nature of the gas to be used for combustion). The gases from this combustion chamber are cooled in a cooler where the gas stream velocity is sufficiently high to keep the resultant ferric oxide entrained, and then passed through a cyclone and gas filter where pure ferric oxide is taken out and passed to hydrogen reduction.

Chlorine, plus any excess oxygen or nitrogen, is passed to chlorine recovery. Prior to this, however, a small amount of this gas stream is bled off and passed over crude sulphur where the chlorine is absorbed quantitatively as a sulphur chloride and passed to the sulphur make-up line for digestion. It would appear that about one pound of make-up sulphur is needed to produce 8 to 10 pounds of powdered iron and a little over a pound of pigment grade titania. See FIG. 2 of the accompanying drawings.

TITANIUM TETRACHLORIDE COMBUSTION

Titanium tetrachloride from the digestion is pumped to a boiler. It is not generally necessary to carry out any extensive purification prior to vaporising the tetrachloride, though it is well known how to further purify the tetrachloride if this should prove necessary. After evaporation, the vapours are blown into a tetrachloride combustion chamber being fed concurrently with air, oxygen or oxygen enriched air, the exact nature of this combustion gas again being determined by the economics of oxygen production against chlorine recovery. The effluent gas is cooled in a cooler, where the velocity of the gas stream is sufficiently high to keep the combustion particles entrained, and passed through a cyclone and gas filter from which pigment grade titania is obtained. The resultant chlorine plus any other waste gases are sent to chlorine recovery. See FIG. 3 of the accompanying drawings.

We claim:

1. A method for treating red mud for extracting iron or titanium metal which comprises, forming a volatile chloride of iron or titanium from red mud by reacting said mud with a hot gaseous mixture of sulphur dioxide and chlorine above the vaporisation temperature of the metal chloride produced during the reaction, separating the gaseous products of the reaction from the solid residue, and isolating the said metal chloride from other gaseous reaction products.

2. A method according to claim 1, wherein the temperature of reaction is in the range of from about 350 to about 450° C.

3. A method according to claim 2, wherein the temperature of reaction is in the range of from about 350 to about 400° C.

4. A method according to claim 1, wherein the solid residue is reacted with hot gaseous mixture of chlorine and sulphur at a temperature above the vaporisation temperature of the metal chloride produced during the reaction but below a temperature at which there is substantial formation of silicon chlorides, separating the gaseous products of the reaction from the solid residue, and isolating the metal chloride from the other gaseous reaction products.

5. A method according to claim 4, wherein the temperature of the chlorine/sulphur reaction is in the range of from about 350 to about 450° C.

6. A method according to claim 4, wherein the sulphur dioxide produced during the chlorine/sulphur reaction is collected for recycling through the sulphur dioxide/chlorine reaction.

7. A method according to claim 4, wherein the ratio of chlorine to sulphur is approximately four-and-a-half to one.

8. A method according to claim 1, wherein the ferric chloride produced is converted to ferric oxide and the titanium tetrachloride produced is converted to titanium dioxide, the chlorine liberated being collected for recycling through the reaction.

9. A method according to claim 1, wherein the material is ground and calcined prior to reaction with sulphur dioxide/chlorine.

References Cited

UNITED STATES PATENTS

| | | | |
|---|---|---|---|
| 3,212,847 | 10/1965 | Lerner et al. | 75—113 X |
| 2,701,179 | 2/1955 | McKinney | 23—87 T |
| 1,834,622 | 12/1931 | Jenness | 75—112 |
| 1,917,228 | 7/1933 | Bacon et al. | 23—87 |
| 2,970,887 | 2/1961 | Hill | 23—87 T |
| 2,868,621 | 1/1959 | Giraitis | 23—87 R |

OTHER REFERENCES

Mellor, J. W.: A Comprehensive Treatise on Inorganic and Theoretical Chemistry, vol. 10, pp. 666, 667, 670, Longmans, Green & Co., London, 1930.

OSCAR R. VERTIZ, Primary Examiner

G. O. PETERS, Assistant Examiner

U.S. Cl. X.R.

23—87, 87 T; 423—79, 133